United States Patent
Zhang et al.

(10) Patent No.: US 11,460,003 B2
(45) Date of Patent: Oct. 4, 2022

(54) WIND TURBINE DAMAGE DETECTION SYSTEM USING MACHINE LEARNING

(71) Applicant: Inventus Holdings, LLC, Juno Beach, FL (US)

(72) Inventors: Huiyi Zhang, Juno Beach, FL (US); Norman Jeffrey Hammitt, Stuart, FL (US); Joseph D Prusa, Juno Beach, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 581 days.

(21) Appl. No.: 16/574,803

(22) Filed: Sep. 18, 2019

(65) Prior Publication Data

US 2021/0079890 A1 Mar. 18, 2021

(51) Int. Cl.
| | |
|---|---|
| F03D 7/04 | (2006.01) |
| F03D 80/50 | (2016.01) |
| F03D 17/00 | (2016.01) |
| G06N 20/00 | (2019.01) |

(52) U.S. Cl.
CPC ............ *F03D 7/046* (2013.01); *F03D 7/048* (2013.01); *F03D 17/00* (2016.05); *F03D 80/50* (2016.05); *G06N 20/00* (2019.01)

(58) Field of Classification Search
None
See application file for complete search history.

(56) References Cited

U.S. PATENT DOCUMENTS

| | | | | |
|---|---|---|---|---|
| 9,389,138 | B2* | 7/2016 | Pistner | G01M 5/0083 |
| 10,088,838 | B2* | 10/2018 | Cao | G05B 23/0235 |
| 2014/0267693 | A1* | 9/2014 | Newman | G01N 25/72 |
| | | | | 348/128 |
| 2015/0240788 | A1* | 8/2015 | Kayama | G01M 5/0016 |
| | | | | 416/61 |
| 2017/0051725 | A1* | 2/2017 | Wang | F03D 17/00 |

(Continued)

FOREIGN PATENT DOCUMENTS

EP 2375068 A3 * 11/2011 ............. F03D 17/00

OTHER PUBLICATIONS

Heinermann, et al. "Machine Learning Ensembles for Wind Power Prediction" Renewable Energy, Department of Computing Science, University of Oldenburg, 26111 Oldenburg, Germany, 2015.

(Continued)

*Primary Examiner* — Michael Lebentritt
(74) *Attorney, Agent, or Firm* — Tarolli, Sundheim, Covell & Tummino LLP (57) ABSTRACT

A system for monitoring a plurality of wind turbines can include a turbine categorizer, executing on one or more computing platforms that categorizes each of a plurality of wind turbines as being damaged or undamaged to form a list of potentially damaged wind turbines. The system can also include a damage evaluator executing on the one or more computing platforms that predicts a damage type and a stage for each wind turbine in the list of potentially damaged wind turbines. The system can further include an impact engine executing on the one or more computing platforms that assigns a repair window and a priority for each wind turbine in the list of potentially damaged wind turbines based on a respective predicted damage type and stage.

20 Claims, 6 Drawing Sheets

(56) References Cited

U.S. PATENT DOCUMENTS

2018/0230971 A1* 8/2018 Ikawa ............... G01D 5/35303
2020/0400127 A1* 12/2020 Lowenhar ............... F03D 17/00

OTHER PUBLICATIONS

Adams, et al., Structural Health Monitoring of Wind Turbines: Method and Application to a HAWT, Paper Presented at AWEA Windpowewr 2010.

Jimenez, et al., "Machine Learning for Wind Turbine Blades Maintenance Management", Energies 2018, 11, 13; doi:10.3390/en11010013, www.mdpi.com/journal/energies.

Leahy, et al., "Diagnosing Wind Turbine Faults Using Machine Learning Techniques Applied to Operational Data" University of California, Berkeley; University College COrk, Ireland; 978-1-5090-0382-2/16, 2016 IEEE.

Wang, et al., "Wind Turbine Blade Breakage Monitoring with Deep Autoencoders", DOI:10.1109/tsg.2016.2621135, IEEE.

Kusiak, et al., "A Data-Driven Approach for Monitoring Blade Pitch Faults in Wind Turbines", IEEE Transactions on Sustainable Energy, vol. 2, No. 1, Jan. 2011.

Yang, et al., "Wind Turbine Condition Monitoring; Technical & Commercial Challenges", Durham University, Durham Research Online, Apr. 18, 2016, http://dx.doi.org/10.1002/we.1508.

Regan, et al., "Wind Turbine Blade Damage Detection Using Various Machine Learning Algorithms", Proceedings of the ASME 2016 International Design Engineering Technical Conferences and Computers and Information in Engineering Conference; IDETC/CIE2016, Aug. 21-24, 2016, Charlotte, North Carolina.

Dervilis, et al., "On Damage Diagnosis for a Wind Turbine Blade Using Pattern Recognition", Journal of Sound and Vibration 333 (2014) 1833-1850.

* cited by examiner

| No. | Description | Fault acknowledgement<br><br>Automatic (A):<br>Automatically if enabled via parameter (B):<br>Automatic reset after reboot<br>Local reset<br>Remote reset | Braking Process<br><br><br><br><br><br><br>V05.04.00 |
|---|---|---|---|
| 01 | PROGRAM START PLC<br>New start of the PLC after reboot.<br>Automatic reset only after long grid loss. | (A), L, R | 4 |
| 02 | NO ERRORS<br>The WTG is ready for operation again after a fault. | A | 0 |
| 03 | MANUAL STOP<br>The WTG was stopped with the key function at the control box in the tower base or at the top cabinet in the nacelle. | A | 2 |
| 06 | SYSTEM OK<br>This message will appear, if the system is working without faults. | A | 0 |
| 07 | STORM SHUTDOWN<br>At wind speeds higher than the corresponding adjusted parameter, the WTG switches off and waits until the wind speed slows down again. The WTG restarts automatically. | A, L, R | 2 |
| 08 | OVERVOLTAGE<br>The line voltage has risen over a predefined limit, in a single phase at least. | A, L, R | 4, 14 |
| 09 | UNDERVOLTAGE<br>The line voltage has dropped below a predefined limit, in a single phase at least. | A, L, R | 4, 14 |
| 10 | UNDERFREQUENCY<br>The line frequency has dropped below a predefined limit. | A, L, R | 4, 14 |
| 11 | OVERFREQUENCY<br>The line frequency has risen over a predefined limit. | A, L, R | 4, 14 |
| 13 | ASYMMETRIC GENERATOR CURRENT<br>In case of asymmetric phase currents, the generator is disconnected from the grid. Generator damage is possible | L, R | 4, 14 |
| 14 | GENERATOR OVERSPEED<br>The generator speed is monitored according to a limit. The WTG is braked when this limit has been exceeded. | L, R | 6.1, 14 |
| 15 | ROTOR OVERSPEED<br>The rotor speed is monitored according to a limit. The WTG is braked when this limit has been exceeded. | L, R | 6.1, 14 |

WIND TURBINE DAMAGE DETECTION SYSTEM USING MACHINE LEARNING

TECHNICAL FIELD

The present disclosure relates to power generation and more particularly to systems and methods for detecting potential damage to wind turbines.

BACKGROUND

A wind turbine is a device that converts the wind's kinetic energy into electrical energy. Wind turbines are manufactured in a wide range of vertical and horizontal axes. The smallest wind turbines are used for applications such as battery charging for auxiliary power for boats or caravans or to power traffic warning signs. Slightly larger turbines can be used for making contributions to a domestic power supply while selling unused power back to the utility supplier via the electrical grid. Arrays of large turbines, known as wind farms, are used by many countries as part of a strategy to reduce reliance on fossil fuels.

A wind farm is a group of wind turbines in the same location used to produce electricity. A large wind farm may have several hundred individual wind turbines and cover an extended area of hundreds of square miles, and the land between the turbines may be used for agricultural or other purposes.

Machine learning is a subset of artificial intelligence in the field of computer science that employs statistical techniques to give computers the ability to "learn" (e.g., progressively improve performance on a specific task) with data, without being explicitly programmed. More particularly, machine learning algorithms build a mathematical model based on sample data, known as "training data", in order to make predictions or decisions without being explicitly programmed to perform the task.

SUMMARY

One example relates to a system for monitoring a plurality of wind turbines. The system can include a turbine categorizer, executing on one or more computing platforms that categorizes each of a plurality of wind turbines as being damaged or undamaged to form a list of potentially damaged wind turbines. The system can also include a damage evaluator executing on the one or more computing platforms that predicts a damage type and a stage for each wind turbine in the list of potentially damaged wind turbines. The system can further include an impact engine executing on the one or more computing platforms that assigns a repair window and a priority for each wind turbine in the list of potentially damaged wind turbines based on a respective predicted damage type and stage.

Another example relates to a system for generating electric power. The system can include a supervisory control and data acquisition (SCADA) system operating on one or more computing platforms that communicates with a plurality of wind turbines and receives environmental data and operating data for each of the plurality of wind turbines. The system can also include a wind turbine monitoring server operating on the one or more computing platforms that categorizes each of the plurality of wind turbines as being damaged or undamaged to form a list of potentially damaged wind turbines based on the environmental data and the operating data. The wind turbine monitoring server can also predict a damage type and a stage for each wind turbine in the list of potentially damaged wind turbines and assign a repair window and a priority for each wind turbine in the list of potentially damaged wind turbines based on a respective predicted damage type and stage. The turbine monitoring server can further store damage data. The damage data can include the list of potentially damaged wind turbines, the predicted damage type and stage for each of the potentially damage wind turbines and the repair window and the priority for each of the plurality of potentially damaged wind turbines.

Yet another example relates to a method for monitoring operation of a plurality of wind turbines. The method can include categorizing, by a turbine categorizer executing on one or more computing platforms, each of a plurality of wind turbines as being potentially damaged or undamaged to form a list of potentially damaged wind turbines. The method can also include predicting, by a damage evaluator executing on the one or more computing platforms, a damage type and a stage for each wind turbine in the list of potentially damaged wind turbines. The method can further include assigning, by an impact engine executing on the one or more computing platforms, a repair window and a priority of repair for each wind turbine in the list of potentially damaged wind turbines based on a respective predicted damage type and stage.

BRIEF DESCRIPTION OF THE DRAWINGS

FIG. 4 illustrates a table of a plurality of different shutdown types and associated braking procedures for a wind turbine.

DETAILED DESCRIPTION

This disclosure relates to a system that employs machine learning to predict damage of wind turbines and determine a priority of repair for the potentially damaged wind turbines. As one example, the system includes a multi-level (e.g., multi-domain) ensemble machine learning engine that identifies (i) potentially damaged wind turbines, (ii) determines a type and stage (e.g., severity) of damage for each potentially damaged wind turbine and (iii) determines a priority and a repair window for each potentially damaged wind turbine. This information is provided to a maintenance scheduler (e.g., scheduling service). The maintenance scheduler can employ the information to dispatch repair crews to inspect and repair each of the potentially damaged wind turbines.

A turbine categorizer operating on a first level of the multi-level ensemble machine learning engine employs a first machine learning algorithm to categorize each wind turbine in a wind farm (or in multiple wind farms) as either potentially damaged or undamaged. As one example, the first machine learning algorithm could be a random forest algorithm. To categorize a given wind turbine, the turbine categorizer analyzes environmental data and operating data for the given wind turbine and calculates operational performance characteristics (e.g., engineering features) of the given wind turbine. A list of the wind turbines that are categorized as potentially damaged is provided to a damage evaluator of the multi-level ensemble machine learning engine.

The damage evaluator operating on a second level of the multi-level ensemble machine learning engine employs a second machine learning algorithm to predict a damage type and stage of each potentially damaged wind turbine. As one example, the second machine learning algorithm could be a long short-term memory (LSTM) machine learning algorithm. The damage evaluator analyzes the environmental and operating data of each potentially damaged wind turbine to predict if a blade on a respective wind turbine is cracked or eroded (or has another type of damage). Further, the damage evaluator also employs the environmental and operating data to predict a stage (e.g., on range/sequence of 0 to 6) of the predicted damage type. In situation where the stage ranges from 0 to 6, stage 0 can indicate no damage and stage 6 predicts a total blade failure that warrants replacement. The list of potentially damaged wind turbines, along with a predicted damage type and the predicted stage is provided to an impact engine of the multi-level ensemble machine learning engine.

The impact engine operating on a third level of the multi-level ensemble machine learning engine employs a third machine learning algorithm to calculate a net benefit for repair to determine a priority for each potentially damaged wind turbine along with a repair window. Each repair window can define a window of time before the respective wind turbine is predicted to fail. As one example, the third machine learning algorithm could be a cluster-based unsupervised machine learning algorithm. The net benefit for repair can be based, for example, on a predicted cost of repair weighed against a predicted availably loss revenue (ALR) for the associated with each potentially damaged turbine. The ALR associated with each potentially damaged wind turbine could represent an amount of revenue that would be lost if the respective wind turbine is not repaired within the repair window. The predicted ALR for the wind turbine could be based on a power purchase agreement (PPA) (and/or other features) that specifies an amount of compensation for each kilowatt hour of power generated that may vary based on a geographical location. The repair window for each potentially damaged wind turbine can be based on the predicted damage type and stage of each respective wind turbine along with an evaluation of a rate of change to calculated performance characteristics. The combination of the net benefit and the repair window can be employed to generate the priority for each potentially damaged wind turbine. The list of potentially damaged wind turbines, along with the predicted damage type, the predicted stage, the priority and the repair window for each potentially damaged wind turbine can be provided to a maintenance scheduler (e.g., a scheduling service).

Further, in some examples, the list of potentially damaged wind turbines, along with the predicted damage type, the predicted stage, the priority and repair window can be generated by a single machine learning algorithm. Additionally, in some examples, operations described as being executing on the first level, the second level and the third level of the multi-level ensemble machine learning engine can be executed on multiple levels or on different levels from that described herein.

The scheduling service can evaluate the potentially damaged wind turbines, along with the predicted damage type, the predicted stage, the priority and repair time for each potentially damaged wind turbine to schedule and deploy repair crews to inspect and possibly repair each of the potentially damaged wind turbines or some subset thereof. Moreover, each repair crew can generate feedback for the multi-level ensemble machine learning engine to improve accuracy over time. For example, if a first wind turbine is predicted to have erosion, and upon inspection the first wind turbine has no observable damage, a report with this information is employed in by the multi-level ensemble machine learning engine to improve predictions of damage to wind turbines. Similarly, if a second wind turbine is predicted to have a severe crack (e.g., a crack with a predicted stage of 4), and upon inspection the second wind turbine has light erosion, a report with this information is employable to improve predictions of the types of damage and the associated stage.

By employing the multi-level ensemble machine learning engine described herein, the repair of wind turbines is prioritized to elevate overall power output and revenue while curtailing costs. As an example, a first wind turbine with a low cost of repair that has a relatively low net benefit for the repair (e.g., due to a low level of revenue per kilowatt hour generated) may be assigned a lower priority than a second wind turbine with a moderate cost of repair that has a relatively high net benefit for the repair (e.g., due to a high level of revenue per kilowatt hour generated). In another situation, a first wind turbine that is predicted to have relatively severe erosion (e.g., a predicted stage of 3) with a relatively long repair window (e.g., 1 year) may be given a lower priority than a second wind turbine that is predicted to have a crack with a relatively low stage (e.g., a predicted stage of 1) with a relatively short repair window (e.g., 2 months). Thus, by employing each of these parameters, the repair of wind turbines is prioritized to elevate overall power output and revenue while curtailing downtime of the wind turbines and costs.

Figure 1:
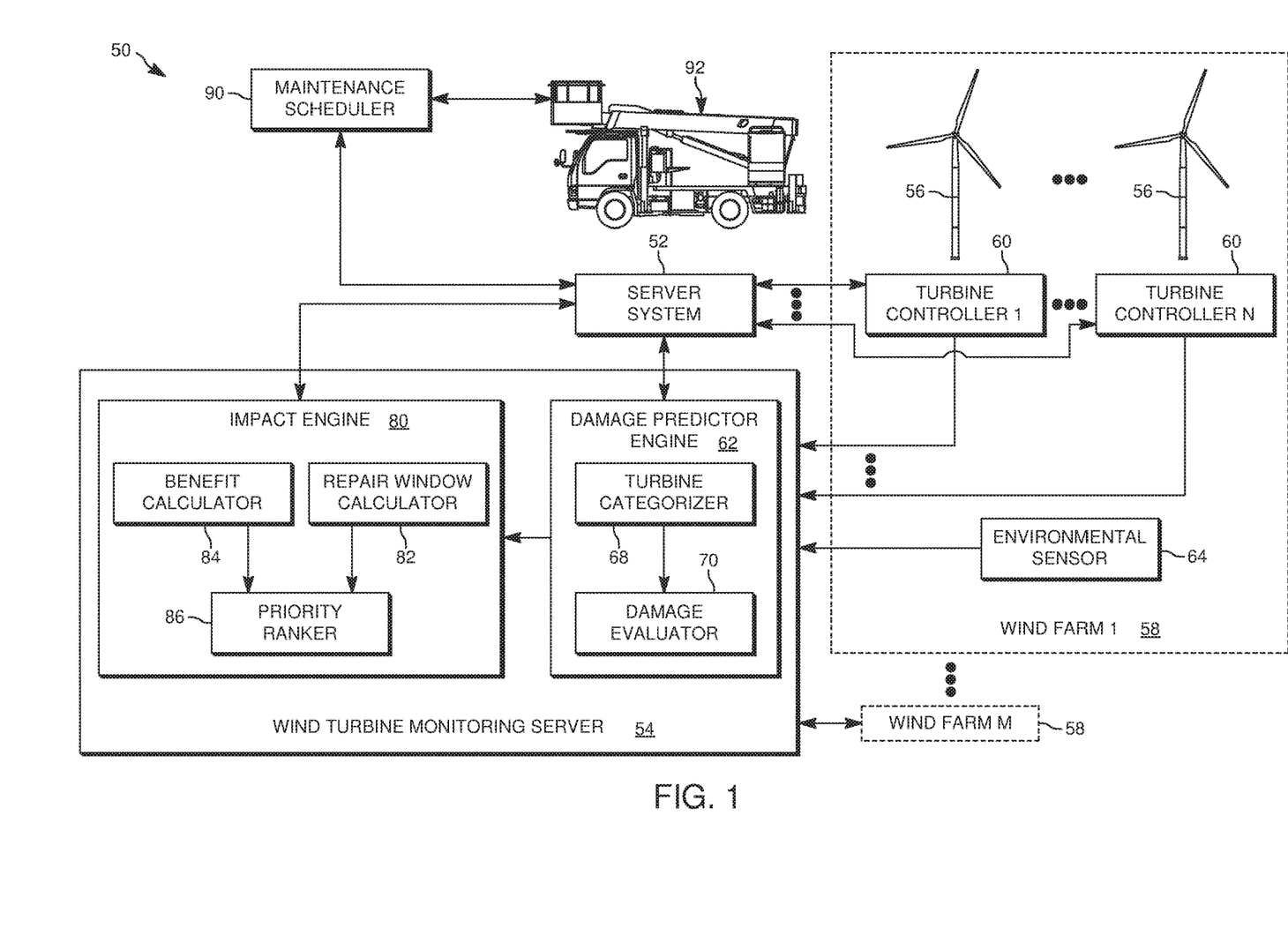
FIG. 1 illustrates a block diagram of an example of an electric generation system with a wind turbine monitoring server that predicts damage of wind turbines.

FIG. 1 illustrates an electric power generation system 50 that includes a server system 52 and a wind turbine monitoring server 54 to predict damage to N number of wind turbines 56 in M number of wind farms 58, where N and M are integers greater than or equal to one (1). Moreover, it is noted that each of the M number of wind farms 58 can have a different number of wind turbines 56. Additionally, in FIG. 1, details are included for only the first wind farm (wind farm 1). However, each of the second through Mth wind farm 58 can be implemented in a similar manner. The server system 52 can be implemented as a computing platform, such as one or more servers that execute application software on top of an operating system. That is, the server system 52 may be implemented as a combination of hardware (e.g., memory and one or more processors) and software. The server system 52 is configured to send control commands to turbine controllers 60 to control the N number of wind turbines 56 that form each of the M number of wind farms 58. In some examples, the server system 52 can be controlled by a third party, such as an original equipment manufacturer (OEM) of the N number of wind turbines 56. In other examples, the server system 52 can be implemented as a (supervisory control and data acquisition) SCADA system. In still other examples, the server system 52 can be representative of a combination of a third party server and a SCADA system operating in concert. The commands are sent to N number of turbine controllers 60 that are each connected to a respective wind turbine 56. The wind farm 58 is coupled to a power grid, and an output power level of the wind farm 58 may be monitored by a substation meter. In this manner, the N number of wind turbines 56 generate power that is provided to the power grid.

The wind turbine monitoring server 54 can also be implemented as a computing platform, such as one or more servers that execute application software on top of an operating system. That is, the wind turbine monitoring server 54 may be implemented as a combination of hardware (e.g., memory and one or more processors) and software that is designed to monitor operations of each the N number of wind turbines 56 to predict failures of the N number of wind turbines, and to predict the type of failure, a stage, a window for repair and assign priority of the repair for each potentially damaged wind turbine 56. In some examples, the server system 52 and the wind turbine monitoring server 54 can communicate over a network (e.g., a utility network). In other examples, the server system 52 and the wind turbine monitoring server 54 can be integrated and operate on the same computing system.

As noted, the wind turbine monitoring server 54 and/or the server system 52 could be implemented on a computing platform. Thus, components of the wind turbine monitoring server 54 and/or the server system 52 can be representative of machine readable instructions stored in a non-transitory memory and one or more processors that access the memory and execute the machine readable instructions. In such a situation, the non-transitory memory can be implemented as volatile memory (e.g., random access memory) and/or non-volatile memory (e.g., a solid state drive, a hard disk drive, flash memory, etc.). Further, the wind turbine monitoring server 54 and/or the server system 52 could be implemented on a computing cloud. In such a situation, features of the wind turbine monitoring server 54 and/or the server system 52, such as a processing unit, a network interface, and a memory could be representative of a single instance of hardware or multiple instances of hardware with applications executing across the multiple of instances (i.e., distributed) of hardware (e.g., computers, routers, memory, processors, or a combination thereof). Alternatively, wind turbine monitoring server 54 and/or the server system 52 could be implemented on a single dedicated server.

As noted, each of the N number of wind turbines 56 is coupled to a corresponding turbine controller 60. Each turbine controller 60 controls the operation of the corresponding wind turbine 56. In particular, each turbine controller 60 turns the corresponding wind turbine 56 on and off in response to a request from the server system 52. Further, each turbine controller 60 can control operating parameters of the wind turbines 56, such as blade pitch, rotor speed, cut-in speed, cut-out speed, etc. Additionally, each turbine controller 60 can provide operating data to the server system 52 that identifies (among other things) an operational state (e.g., on, off, rotor speed, azimuth position, vibrations, mode shape and flap, blade pitch, power output, etc.) of the corresponding wind turbine 56. The operating data can be provided from data gather by sensors mounted on each respective wind turbine 56. Such sensors can include, but are not limited to an azimuth sensor, a mode shape and flap (MSF) sensor, a frequency sensor (e.g., to measure vibrations), etc. Additionally or alternatively, the operating data can include mechanical information about each wind turbine 56, such as the model/manufacturer, maximum power output, power curve information, blade span, airfoil profiles, chord lengths and/or twist of the blades of each respective wind turbine 56.

Each turbine controller 60 could be implemented, for example, as a programmable logic controller (PLC). The server system 52 can provide commands to each of the N number of turbine controllers 60 at each of the M number of wind farms 58 to change the operating parameters of the corresponding wind turbine 56. In response, the turbine controller 60 updates the operating parameters of the corresponding wind turbine 56. Moreover, each of the turbine controllers 60 at the M number of wind farms 58 can provide the operating data for each respective wind turbine 56 to the server system 52.

The wind turbine monitoring server 54 is programed to implement a multi-level ensemble machine learning engine to predict damage of the N number of wind turbines 56, predict the stage of the damage and to determine a repair window and net benefit for the repair of each potentially damaged wind turbines 56. This information can be employed by the multi-level ensemble machine learning engine to assign a priority of repair to each of the potentially damaged wind turbines. More specifically, the wind turbine monitoring server 54 can include an damage predictor engine 62 (which may also be referred to as a damage model) that can be representative of a software module executing on the wind turbine monitoring server 54. The damage predictor engine 62 can receive the operating data for each of the N number of wind turbines 56. In some examples, the damage predictor engine 62 can receive the operating data from the turbine controllers 60, and in other examples, the damage predictor engine 62 can receive the operating data for each of the N number of wind turbines 56 from the server system 52.

Each of the M number of wind farms 58 can include an environmental sensor 64 that can detect environmental conditions of the wind farm 58. The environmental sensor 64 can be representative of a plurality of environmental sensors. The environmental sensor 64 can measure ambient conditions such as wind speed, temperature, pressure and relative humidity of the wind farm 58. The environmental sensor 64 can provide measured environmental data to the damage predictor engine 62 that characterizes the measured ambient conditions of the wind farm 58 directly or via the server system 52. In some examples, the environmental sensor 64 can be located and operated on an external system, such as a meteorological station (e.g., weather station) in relatively close proximity (e.g., up to about 20 kilometers) from the wind farm 58.

The damage predictor engine 62 can include a turbine categorizer 68 programmed/configured to categorize each of the N number of wind turbines 56 for each of the M number of wind farms 58 as potentially damaged or not damaged in a first level of the ensemble machine learning engine of the wind turbine monitoring server 54. That is, the turbine categorizer 68 can employ a machine learning algorithm or multiple machine learning algorithms to analyze the measured environmental data and the operating data to predict whether each wind turbine 56 of the N number of wind turbines 56 is operating properly. In one example, the turbine categorizer 68 can calculate engineering features (e.g., operating conditions) that are employed in a random forest machine learning algorithm to categorize each wind turbine 56 as potentially damaged and undamaged. The engineering features can include each of the engineering features identified in Table 1 or some subset thereof.

TABLE 1

| | |
|---|---|
| 1 | Rotor Blade Dynamic Gravity Impact |
| 2 | Rotor Imbalance |
| 3 | Long Short-Term Turbulence Intensity |
| 4 | Aerodyanmic Performacne |
| 5 | Weather Impact |
| 6 | Accumulative Outliers of Nacelle Position |
| 7 | Axial Load Impact |
| 8 | Shut Down Impact |
| 9 | Pitch Analmoy |
| 10 | Weak Effect |

The engineering features can be employed by the turbine categorizer 62 to train a model for each wind turbine 54 that characterizes operating behavior of each respective wind turbine 54. This resultant model can be employed by the turbine categorizer 68 to categorize (e.g., classify) each of the N number of wind turbines 56 at each of the M number of wind farms 58 as potentially damaged or undamaged. The turbine categorizer 68 can generate and/or augment damage data that include a list of potentially damaged wind turbines 56 categorized by the turbine categorizer 62. The damage data can be provided to a damage evaluator 70 operating on the damage predictor engine 62.

In a second level of the multi-level ensemble machine learning engine, the damage evaluator 70 can employ the environmental data and the operating data for each of the potentially damaged wind turbine 56 identified in the damage data to predict a particular damage type and stage (e.g., severity) of the particular type of damage. As some examples, the damage type could be one or more damage types listed in Table 2. Moreover, as one example, the stage can range from 0 (no damage) to 6 (most severe/failure). However, in other examples, other ranges are employable.

TABLE 2

| | |
|---|---|
| 1 | Scratch |
| 2 | Evidence of mechanical component leakage |
| 3 | Vortex generators |
| 4 | Flaking |
| 5 | Erosion |
| 6 | Chip |
| 7 | Transverse crack |
| 8 | Lightning receptor system |
| 9 | Leading edge damage |
| 10 | Longitudinal crack |
| 11 | Erosion into laminate |
| 12 | Holes into laminate |
| 13 | Other crack |
| 14 | Trailing edge damage |
| 15 | Discoloration |
| 16 | Pain flaking |
| 17 | Delamination/fiber tearout |

The damage evaluator 70 can employ a machine learning algorithm or multiple machine learning algorithms including, but not limited to a long short-term memory (LSTM) or other recurrent neural network (RNN) to predict the damage type and the stage of the damage type. In such a situation, the LSTM can be trained with previously observed environmental and operating data to generate a model for predicting each of the damage types and stage. Upon training the LSTM, the damage evaluator 70 can analyze the environmental data and the operating data for each potentially damaged wind turbine over an interval of time to classify (predict) the damage type and rate the stage. The damage evaluator 70 can augment the damage data with the predicted damage type and stage for each of the potentially damaged wind turbines 56. Moreover, the damage data can be provided to an impact engine 80 of the wind turbine monitoring server 54.

The impact engine 80 can be programmed/configured to execute a third level of the multi-level ensemble machine learning engine to determine a repair window and priority for repairing each of the potentially damaged wind turbines 56. As one example, the impact engine 80 can execute a cluster based unsupervised machine learning algorithm.

More particularly, the impact engine 80 can include a repair window calculator 82 that can calculate a window of time to repair each of the potentially damaged wind turbines 56, which window of time can be referred to as a repair window. The repair window can define an amount of time between the present time and a time at which an associated wind turbine is predicted to advance to a stage where the associated wind turbine experiences a fault/failure, which would increase the cost of repair. The repair window for each potentially damaged wind turbine 56 can be based on rate of decay calculated from the damage type and stage characterized in the damage data. For example, a given wind turbine 56 with damage of a given type (e.g., a longitudinal crack) at an early stage (e.g., stage of 1) would likely have a longer the repair window than another wind turbine 56 with damage of the same given type (e.g., a longitudinal crack) at a late stage (e.g., stage of 4) since both wind turbines 56 may have the same rate of decay. However, in situations where different wind turbines 56 have different damage types, the stage may not be the controlling factor for determining the repair window. For instance, if a first wind turbine 56 has a first damage type (e.g., discoloration) with a late stage (e.g., stage of 5) and a second wind turbine 56 has a damage of a second type (e.g., a transverse crack) with a relatively early stage (e.g. stage of 2), the second wind turbine 56 may still have a shorter repair window since the rate of decay for the second damage type (e.g., a traverse crack) may be faster than the rate of decay for the first damage type (e.g., discoloration). The impact engine 80 can augment the damage data associated with each potentially damaged wind turbine 56 with the calculated repair window.

The impact engine 80 can also include a benefit calculator 84 that calculates a net benefit for repairing each potentially damaged wind turbine. To calculate the net benefit, the benefit calculator 84 evaluates the damage data associated with each potentially damaged wind turbine 56 to determine a cost of repair. More particularly, the benefit calculator 84 calculates a cost of repair of each potentially damaged wind turbine based on the predicted damage type and stage. For example, if a given wind turbine 56 is predicted to have a severe (e.g., stage of 4) longitude crack in a blade, the cost of repair could include a replacement cost for the blade, the labor costs for repairing the given wind turbine 56 and the cost of dispatching a service crew (e.g., travel costs).

Additionally, the benefit calculator 84 can calculate a predicted availability loss revenue (ALR) a predicted failure of the given wind turbine 56 based on a power purchase agreement (PPA) (and/or other applicable financial agreements/laws) for the given wind turbine 56, a predicted amount of power generated by the given wind turbine and a predicted amount of time that the repair will take to complete the repair of the given wind turbine. Stated differently, the predicted ALR for each potentially damaged wind turbine can represent a predicted amount of revenue that will be lost by not repairing each potentially damaged wind turbine 56 within the repair window (e.g., prior to failure). For example, if a first wind turbine is located in a geographical area with a high demand for generated power (based on a first PPA), the expected revenue is likely greater than a second wind turbine in a second geographical location with a low demand for generated power (based on a second PPA).

In such a situation, the cost of allowing the first wind turbine 56 to fail (and not generate power) may be significantly greater than the cost of allowing the second wind turbine 56 to fail. Thus, the predicted ALR for the first wind turbine 56 may be greater than the predicted ALR for the second wind turbine 56.

Further, in another example, a first wind turbine 56 and a second wind turbine 56 may have different predicted amounts of generated power that can impact the predicted ALR. In this situation, if the first wind turbine 56 has a predicted power generation that is twice that of the second wind turbine 56, and the first and second wind turbines 56 are in the same wind farm and share the same PPA, the predicted ALR for the first wind turbine 56 may be greater than the predicted loss of the second wind turbine 56 even if the repair window of the second wind turbine is shorter than the first wind turbine 56.

As one simplified example, the benefit calculator 84 can subtract the cost of repair from the predicted loss of revenue to determine the net benefit for each potentially damaged wind turbine 56. It is noted that additional details and other procedures for calculating the net benefit are provided herein. Thus, the net benefit can represent an net revenue (e.g., profit) that is generated from repairing each wind turbine 56 within the repair window. The impact engine 80 can augment the damage data with the repair window, the ALR and the net benefit calculated for each potentially damaged wind turbine 56.

The impact engine 80 can also include a priority ranker 86 that can analyze the net benefit and repair window for each potentially damaged wind turbine 56 and rank the priority for repairing each wind turbine 56. In some examples, the potentially damaged wind turbine 56 with the greatest net benefit may have the highest priority. However, in an example where a first wind turbine 56 has a repair window of about six (6) months and a second wind turbine 56 has a repair window of about one (1) month, but the first wind turbine 56 has a net benefit that is greater than the second wind turbine 56, the second wind turbine 56 may be assigned a higher priority. The impact engine 80 can augment the damage data with the priority of each potentially damaged wind turbine 56. The wind turbine monitoring server 54 can store the damage data in a memory of the wind turbine monitoring server 54 and/or in an external database that can be accessed by the wind turbine monitoring system 54 and/or other systems.

The wind turbine monitoring server 54 can provide the damage data to the server system 52. The server system 52 can supply the damage data to a maintenance scheduler 90. The maintenance scheduler 90 can be representative of software executing on a server (e.g., a computing platform) that can dispatch a service crew 92 (representative of multiple service crews) to repair the potentially damaged wind turbines 56. To dispatch the service crew 92, the maintenance scheduler 90 can generate a service ticket that can be transmitted to a terminal (e.g., a mobile computing platform) operated by a member of the service crew 92. Moreover, the service ticket can include information identifying the potentially damaged wind turbine 54, as well as information characterizing the expected type of damage and the expected stage. Accordingly, the service crew 92 can employ this information to obtain repair parts that may be needed to provide service for the potentially damaged wind turbine 56.

The maintenance scheduler 90 can employ the damage data for each potentially damaged wind turbine to determine the order that the potentially damaged wind turbines 56 are to be repaired. In some examples, the maintenance scheduler 90 can dispatch the service crew 92 to repair the potentially damaged wind turbines based on the priority of each potentially damaged wind turbine 56.

In other examples, the maintenance scheduler 90 can weigh additional factors, such as geography and/or availability of repair parts to determine the order in which the potentially damaged wind turbines 56 are repaired. For example, the maintenance scheduler 90 could encounter a situation where the service crew 92 is dispatched to repair a first potentially damaged wind turbine 56 with a highest priority and a second potentially damaged wind turbine 56 is located at the same wind farm 58 has a lower priority than a third potentially wind turbine 56 (with a priority lower than the first potentially damaged wind turbine 56) at a different wind farm 58. In this situation, the maintenance scheduler 90 could be programmed/configured to dispatch the service crew 92 to repair both the first potentially damaged wind turbine 56 and the second potentially damaged wind turbine 56 due to the proximity in geography of the first and second potentially damaged wind turbines 56. That is, the maintenance scheduler 90 can be configured to dispatch the service crew 92 to the second potentially damaged wind turbine 56 prior to dispatching the service crew 92 to repair the third potentially damaged wind turbine 56.

In a situation where the service crew 92 is dispatched to the repair a particular potentially damaged wind turbine 56, upon arrival, the service crew 92 inspects the potentially damaged wind turbine 56 to verify or refute the predicted damage type and associated stage. Upon completing the service, a member of the service crew 92 can prepare a report on the findings of the inspection and subsequent repair. In some situations, the predicted damage type may be inaccurate. Additionally or alternatively, the predicted stage of the damage type may be inaccurate. In some other examples, an inspection may reveal that the potentially damaged wind turbine 56 was miscategorized, and that the potentially damaged wind turbine should have been categorized as undamaged. In any such situation, the report can be received at the maintenance scheduler 90.

The maintenance scheduler 90 can provide feedback data characterizing the report to the server system 52. The server system 52 can forward the feedback data to the wind turbine monitoring server 54. In response, the wind turbine monitoring server 54 can analyze the feedback data and employ the feedback data to improve the accuracy of the multi-level machine learning algorithm. Thus, over time, the accuracy of predictions made by the damage predictor engine 62 and/or the impact engine 80 can improve.

By employing the system 50, damaged wind turbines 56 can be identified and serviced prior to failure. That is, the environmental data and operating data collected for each of the N number of wind turbines is employable by the multi-level ensemble machine learning engine to predict a: failure, a type and stage of such failure, when such failure is likely to occur, a repair window and a net benefit for repairing a wind turbine 56 prior to such failure. Further, this information is employed to prioritize dispatch of the service crew 92 for repair of the wind turbines 56 predicted to fail. In this manner, downtime of the N number of wind turbines 56 is curtailed.

Figure 2:
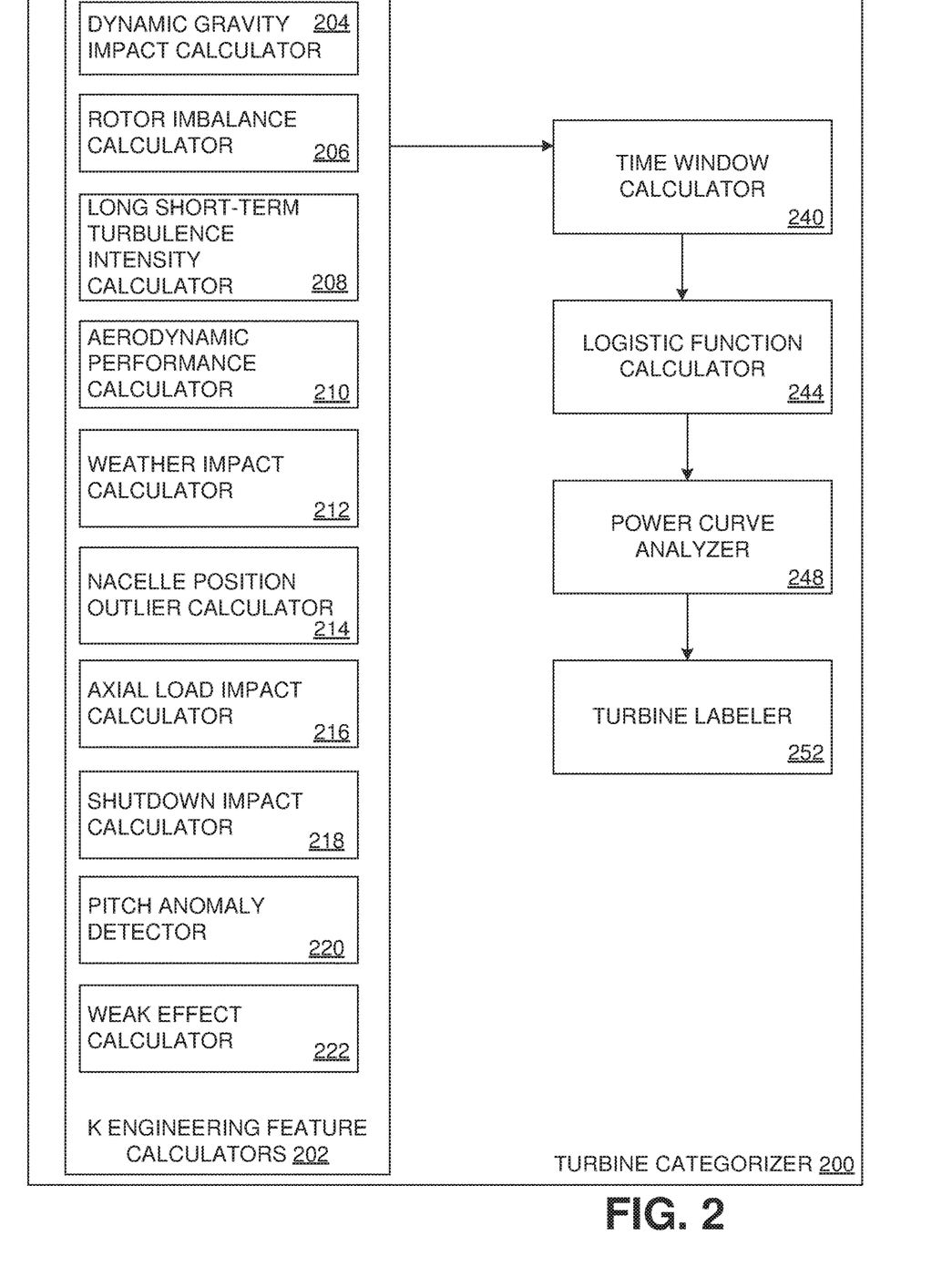
FIG. 2 illustrates a block diagram of a turbine categorizer that can categorize wind turbines as potentially damaged or undamaged.

FIG. 2 illustrates an example of a turbine categorizer 200 that is employable to implement the turbine categorizer 68 of FIG. 1. The turbine categorizer 200 can be executed on a computing platform, such as the wind turbine monitoring server 54 of FIG. 1. Moreover, the turbine categorizer receives (directly or indirectly) environmental data and operating data for a plurality of wind turbines, such as the N number of wind turbines 56 at the M number of wind farms 58 as is illustrated in FIG. 1. As discussed in detail herein, the turbine categorizer 200 employs a machine learning algorithm such as a Random Forest algorithm to categorize each wind turbine as either potentially damaged or undamaged based on the environmental data and the operating data received at the turbine categorizer 200.

The turbine categorizer 200 can include K number of engineering feature calculators 202, where K is an integer greater than or equal to one (1). Each of the K number of engineering feature calculators 202 are configured to provide a series of time dependent data, (e.g., times series data) wherein each set of the time series data represents an observed and/or calculated condition at a particular instant in time. In some examples, the resultant time series data set can span over weeks, months or years. In such situations, the time instances can be periodic or aperiodic. Moreover, in FIG. 2, there are ten (1) engineering features illustrated and described. However, in other examples, there could be more or less engineering features employed.

The K number of engineering feature calculators 202 can include a dynamic gravity impact calculator 204. The dynamic gravity impact calculator 204 provides time series data that represents a calculated impact that gravity has on each blade of each of the plurality of wind turbines. To calculate dynamic impact for a given wind turbine, the dynamic gravity impact calculator 204 calculates a blade location along a rotor of the given wind turbine for each blade on the given wind turbine at a given instant in time based on an azimuth sensor and rotation speed included in the operating data. More particularly, for a time, t, an angular distance, θ from the azimuth sensor for a given wind turbine can be calculated with Equations 1 and 2.

$$\theta = \omega t \quad \text{Equation 1}$$

$$\omega = \frac{60n}{2\pi} \quad \text{Equation 2}$$

Wherein:
n is the rotational speed of the given wind turbine in rotations per minute (rpm).

Additionally, for each such blade, the dynamic gravity impact calculator 204 calculates a dynamic gravity based on location of the respective blade for the given instant in time based on the calculated angular distance, θ. The dynamic gravity of a first blade of three (3) blades on a given wind turbine for a time, t can be calculated with Equation 3. The dynamic gravity of a second blade of the three (3) blades for the given wind turbine can be calculated with Equation 4 and the dynamic gravity of a third blade of the three (3) blades can be calculated with Equation 5.

$$G = mg^* \cos\theta \quad \text{Equation 3}$$

$$G = mg^* \cos(\theta + 120°) \quad \text{Equation 4}$$

$$G = mg^* \cos(\theta + 240°) \quad \text{Equation 5}$$

Wherein:
θ is the angular distance calculated with Equations 1 and 2;
m is the mass of the given blade on the given wind turbine; and
g is the force of gravity.

The dynamic gravity impact calculator 204 can repeat the calculation of the location and the corresponding dynamic gravity for a plurality of time instances that spans, days, weeks, months or years to provide the time series data set for the dynamic gravity impact for each of the plurality of wind turbines.

The K number of engineering feature calculators 202 can include a rotor imbalance calculator 206. The rotor imbalance calculator 206 can calculate a rotor imbalance of each wind turbine based on operating data for the corresponding wind turbine. In particular, the rotor imbalance calculator 206 can receive data characterizing a mode shape and flap (MSF) of the blades of each wind turbine from a respective MSF sensor provided from the server system 52 of FIG. 1 (e.g., a SCADA system). In one example, for each wind turbine, the MSF sensor readings for a given rotor of a given wind turbine can be received for 45 degrees, 135 degrees, 225 degrees and 315 degrees. In other examples, the readings could be taken at different degrees for the given wind turbine. The rotor imbalance calculator 206 can employ these MSF sensor readings (or some subset thereof) to calculate the rotor imbalance for the rotor of the given wind turbine at an instant in time, t. The rotor imbalance calculator 206 can determine a mean and standard deviation of each of the sensor readings (e.g., at 45 degrees, 135 degrees, 225 degrees and 315 degrees) at one-minute intervals (or other time intervals) from the data provided from the MSF sensors (e.g., raw data). The rotor imbalance calculator 206 can employ the standard deviation of the four MSF mean values to calculate the standard deviation at one-minute intervals (or other time interval) using Equation 6.

$$s = \sqrt{\frac{1}{B-1}\sum_{i=1}^{B}(x_i - \bar{x})^2} \quad \text{Equation 6}$$

Wherein:
B=4; and
$x_i$ is the ith (of four) MSF mean values at the one-minute interval (or other time interval)

Additionally, the rotor imbalance calculator 206 can repeat the calculation of the rotor imbalance over a plurality of time instances that spans days, weeks, months or years to provide a time series data set characterizing the rotor imbalance for each of the plurality of wind turbines.

The K number of engineering feature calculators 202 can include a long short-term turbulence intensity calculator 208. The long short-term turbulence intensity calculator 208 can employ the environmental data and the operating data to calculate a turbulence intensity variance for a window of time (e.g., a one-minute window of time) for each wind turbine in the plurality of wind turbines. The calculate the turbulence intensity, TI for the one minute window of time, the long short-term turbulence intensity calculator 208 can employ Equation 7.

$$TI = sd/v \quad \text{Equation 7}$$

Wherein:
sd is a standard deviation of wind speed aggregated at the one-minute interval; and
v is a mean wind speed aggregated at the one-minute interval.

Figure 3:
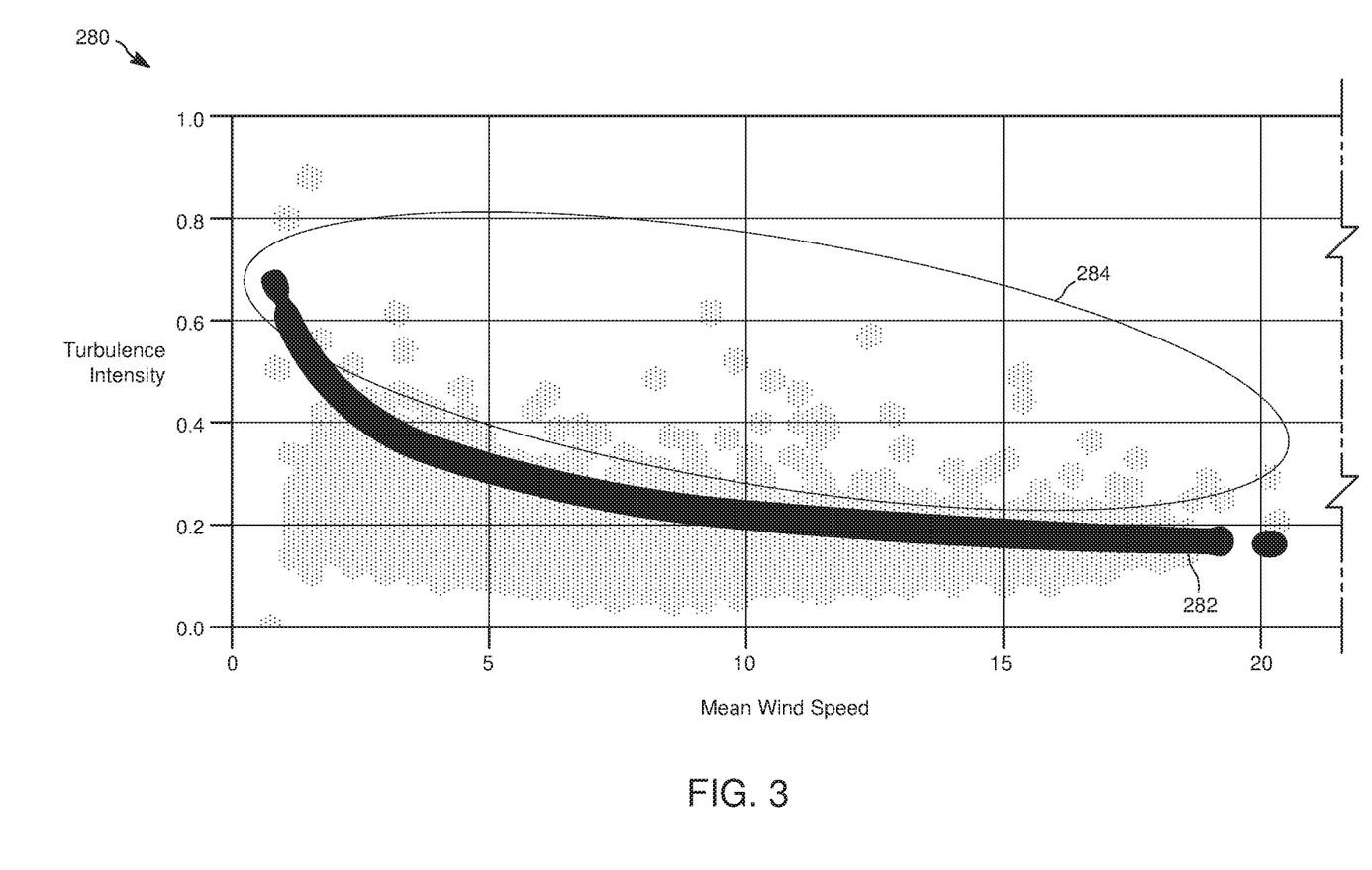
FIG. 3 illustrates a scatter plot that plots turbulence intensity as a function of wind speed for a wind turbine.

Additionally, the long short-term turbulence intensity calculator 208 can calculate an accumulative turbulence intensity impact for the window of time for each wind turbine. To calculate the accumulative intensity, the long short-term turbulence intensity calculator 208 can compute a super turbulence intensity by comparing the long short-term turbulence intensity plotted as a function of a mean wind speed. FIG. 3 illustrates an example of a scatter plot 280 of long short-term turbulence intensity plotted as a function of mean wind speed in meters per second (m/s) for a given wind turbine. The long short-term turbulence intensity calculator 208 interpolates a power curve 282 with a power function, $y=ax^b$, where a and b are coefficients depending on the specific shape of a predetermined power curve for the design of the given turbine. The long short-term turbulence intensity calculator 208 can sum the super turbulence intensity points that is above the power curve 282, indicated by the ellipse 284, and bin these super turbulence intensity points at a different speed interval.

Referring back to FIG. 2, the long short-term turbulence intensity calculator 208 can repeat the calculation of accumulative intensity impact over a plurality of windows of time that spans days, weeks months or years for each of the plurality of wind turbines to provide a time series data set characterizing the accumulative intensity impact for each of the plurality of wind turbines.

The K number of engineering feature calculators 202 can include an aerodynamic performance calculator 210. The aerodynamic performance calculator 210 employs the environmental data and the operating data to calculate a time series data set that characterizes the aerodynamic performance of each of the plurality of wind turbines. As an example, for a given wind turbine, the aerodynamic performance calculator 210 calculates a (estimated) first tip-speed-ratio based on a rotor rotational speed of the given wind turbine. Additionally, the aerodynamic performance calculator 210 calculates a second (estimated) tip-speed-ratio based on measured rotations per minute (RPM) for the generator of the given wind turbine. The aerodynamic performance calculator 210 calculate an adjustable tip-speed-ratio parameter. In some examples, the first tip-speed-ratio, the second tip-speed-ratio and the adjustable tip-speed-ratio can be calculated from operating data corresponding to data parameters read from sensors at the given wind turbine. Additionally, the aerodynamic performance calculator 210 can repeat the calculation of the first tip-speed-ratio, the second tip-speed-ratio and the adjustable tip-speed-ratio over a plurality of windows of time that spans days, weeks months or years for each of the plurality of wind turbines to provide a time series data set characterizing the accumulative intensity impact.

The K number of engineering feature calculators 202 can include a weather impact calculator 212. The weather impact calculator 212 employs the environmental data and the operating data to generate a time series data that characterizes an impact that weather has on each of the plurality of wind turbines. In particular, the weather impact calculator 212 calculates a mean and standard deviation of an ambient temperature, $T_{amb}$ and a hub temperature, $T_{hub}$ for each of the plurality of wind turbines. For each wind turbine, the weather impact calculator 212 compares the ambient temperature, $T_{amb}$ and the hub temperature, $T_{hub}$ to curtail (e.g., minimize) inaccurate readings to non-alarmed failed temperature sensors. Accordingly, in some examples, the weather impact calculator 212 can employ the comparison to calculate a correlation between temperature and power generation to provide a time series of data for each wind turbine that characterizes the impact that temperature has on damage progression. Moreover, the weather impact calculator 212 can repeat the calculation of the impact of temperature for a plurality of windows of time that spans days, weeks months or years for each of the plurality of wind turbines to provide a time series data set characterizing the temperature impact.

Additionally, the weather impact calculator 212 calculates a correlation between performance and humidity for each wind turbine. In some examples, This correlation can provide a time series of data for each wind turbine that characterizes the correlation to a humidity reading of each wind turbine and power generated by each wind turbine to predict an impact that humidity has on damage progression of each wind turbine. Moreover, the weather impact calculator 212 can repeat the calculation of the impact of humidity for a plurality of windows of time that spans days, weeks months or years for each of the plurality of wind turbines to provide a time series data set characterizing the humidity impact for each of the plurality of wind turbines.

The K number of engineering feature calculators 202 can include a nacelle position outlier calculator 214. The nacelle position outlier calculator 214 employs the environmental data and the operating data to calculate time series data for each wind turbine that characterizes an accumulation of a nacelle of each wind turbine being at an outlier position. Stated differently, the nacelle of each wind turbine (which houses the rotor and other electronics) rotates to face the wind to enhance power generation. However, in some positions (e.g., the outlier positions), the nacelle of a given wind turbine does not face the wind at the wind's strongest angle, which can damage the given wind turbine over time. A changing position of a given wind turbine can be calculated by the nacelle position outlier calculator 214 with Equation 8.

$$\Delta Position = Nacelle\ position - wind\ direction \quad \text{Equation 8}$$

Wherein:
ΔPosition is the changing position of the nacelle for an instance in time;
Nacelle Position is the Nacelle position of the given wind turbine at the instance in time; and
wind direction is the is the direction that the wind is strongest at the instance in time.

Thus, the nacelle position outlier calculator 214 calculates a time series data set that characterizes the cumulative impact of the nacelle of each wind turbine being at an outlier position for each of the plurality of wind turbines. Moreover, nacelle position outlier calculator 214 can repeat the calculation of the nacelle outlier positions for a plurality of windows of time that spans days, weeks months or years for each of the plurality of wind turbines to provide the time series data set characterizing the cumulative impact of the nacelle being at an outlier position for each of the plurality of wind turbines.

The K number of engineering feature calculators 202 can include an axial load impact calculator 216. The axial load impact calculator 216 employs the environmental data and the operating data to calculate time series data for each of the plurality of wind turbines that characterizes an accumulative impact that an axial load has on the performance of a respective wind turbine. Additionally, the axial load impact calculator 216 employs the time series data of the accumulative impact of the axial load on a respective wind turbine to calculate a correlation to service time for the respective wind turbine. To calculate the correlation of service time to accumulative axial load, the axial load impact calculator 216 can analyze the operation data and/or the environmental data that corresponds to frequency sensors that measure back and forth as well as side by side vibration under a bedplate of a drivetrain system at each of the plurality of wind turbines. The axial load impact calculator 216 can calculate a mean and standard deviation over one-minute intervals of time (or another interval of time) of the measured vibrations from these frequency sensors to calculate the accumulative axial load impact for windows of time that spans days, weeks months or years for each of the plurality of wind turbines to provide a time series data set characterizing the accumulative axial load for each of the plurality of wind turbines.

The K number of engineering feature calculators 202 can include a shutdown impact calculator 218 that employs the environmental data and the operating data to calculate time series data for each wind turbine that characterizes an accumulative impact of shutting down each wind turbine. There are multiple shut-down procedures for each wind turbine. As one example, there may be six (6) ways to apply a brake to a wind turbine that can be specified by an original equipment manufacturer (OEM) of each wind turbine. FIG. 4 illustrates a table 290 that lists each type of shutdown and a corresponding braking process (or processes). The shutdown impact calculator 218 can calculate an accumulative impact that each shut-down procedure has on each of the plurality of wind turbines.

Referring back to FIG. 2, for each type of the braking procedures of a given wind turbine, the shutdown impact calculator 218 can calculate the accumulative trips of each brake procedure type, with different weights applied to each brake procedure type. As an example, the accumulative impact of the different braking types for a given wind turbine can be calculated with Equation 9.

$$I_{braking} = \Sigma_{i=1}^{R} w_i * \text{count}(\text{trip}_i) \quad \text{Equation 9}$$

Wherein:
R is the number of different types of braking procedures (e.g., 6);
$w_i$ is the weigh given to the ith braking procedure; and
$\text{trip}_i$ is the tripping of the ith type of braking procure.

Moreover, the shutdown impact calculator 218 can repeat the calculation of the accumulation of braking procedures for a plurality of windows of time that spans days, weeks months or years for each of the plurality of wind turbines to provide a time series data set characterizing the accumulative impact of shutdowns for each of the plurality of wind turbines.

The K number of engineering feature calculators 202 can include a pitch anomaly detector 220 that employs the environmental data and the operating data to calculate time series data for each wind turbine that characterizes an impact of irregular pitch positions in the plurality of wind turbines. The pitch anomaly detector 220 can employ the operating data to measure real-time changes to a blade pitch on each wind turbine. Moreover, the pitch anomaly detector 220 can analyze the real-time changes to the blade pitch to determine a time series set that represents an existence or non-existence of an irregular blade pitch for each of the plurality of wind turbines.

As one example, the pitch anomaly detector 220 can calculate a pitch anomaly for a one-minute wind of time (or other time interval) for a given wind turbine with Equation 10.

$$P_{anomaly} = \Sigma_{i=1}^{3} (\text{Pitch\_i}_{set} - \text{Pitch\_i}_{actual}) \quad \text{Equation 10}$$

Wherein:
$P_{anomaly}$ is the accumulative of pitch anomalies for the given wind turbine for each of the blade of the given wind turbine;
$\text{Pitch\_i}_{set}$ is the set pitch for the ith blade of the given wind turbine read from pitch angles included in the operating data; and
$\text{Pitch\_i}_{actual}$ is the actual pitch for the ith blade of the given wind turbine read from pitch angles included in the operating data.

Moreover, the pitch anomaly detector 220 can repeat the calculation of the accumulation of pitch anomalies for a plurality of windows of time that spans days, weeks months or years for each of the plurality of wind turbines to provide a time series data set characterizing the pitch anomaly detection for each of the plurality of wind turbines.

The K number of engineering feature calculators 202 can include a weak effect calculator 222 that employs the environmental data and the operating data to calculate time series data for each wind turbine that characterizes an impact of geography on each of the plurality of wind turbines. More particularly, for each wind turbine, the weak effect calculator 222 measures an impact on power generation that geographical location (e.g., longitude and latitude coordinates) of each respective wind turbine and associated wind characteristics (e.g., wind velocity). Moreover, the weak effect calculator 222 can repeat the calculation of the impact of geography for a plurality of windows of time that spans days, weeks months or years for each of the plurality of wind turbines to provide a time series data set characterizing the impact of geography for each wind turbine.

Time series data from each of the K number of engineering feature calculators 202 can be provided to a time window calculator 240 of the turbine categorizer 200. The time window calculator 240 is configured to select a time window in each time series data set provided by the K number of engineering feature calculators 202.

The time window calculator 240 can select a length of time, in days, w. The total number of days, w can be individual days, months, weeks or years. The time window calculator 240 can calculate the mean (e.g., the arithmetic mean, the median or the mode), the maximum and minimum values and standard deviation for each time series corresponding to an engineering feature provided by the K number of engineering feature calculators 202 over a window of time spanning from a start date, startdate to the number of days, w. This window of time is convolved across the time series data with a stride, s, such that an $i^{th}$ snapshot of a given time series corresponds to time, $t_i$, as given in Equation 11.

$$t_i = \text{startdate} + w + s(i-1) \quad \text{Equation 11}$$

wherein:
$t_i$ is the snapshot at time instance, i, for the given time series data provided by the K number of engineering feature calculators 202;
startdate is the starting date for the given time series;
w is the length of time, in days, selected by the time window calculator 240; and
s is the stride between instances of data in each the given time series.

Moreover, for each time series data set provided by the K number of engineering feature calculators 202, the interval of time, $\text{interval}_i$ for which the mean, maximum, minimum and standard deviation are calculated can be defined by Equation 12.

$$\text{interval}_i = [\text{startdate} = s(i-1), \text{startdate} + w + s(i-1)] \quad \text{Equation 12}$$

In some examples, rather than calculating the mean, minimum, maximum and standard deviation for each time series dataset for the interval of time defined by Equation 12, the time window calculator 240 can employ a poling rate of about one (1) minute and execute unsupervised learning techniques to identify clusters. For example, the time window calculator 240 can analyze a kernel density estimation (KDE) plot for each time series dataset from the K number of engineering feature calculators 202 to select bin distributions for construction of histograms aggregating each time series data set on monthly and/or yearly intervals.

The time window calculator 240 can provide the mean, minimum, maximum and standard deviation for each time series dataset representing or the constructed histograms for each time series data set to a logistic function calculator 244. The logistic function calculator 244 can calculate parameters for a logistic function for each wind turbine of the plurality of wind turbines defined, as by Equation 13. Moreover, the logistic function calculator 244 can employ a limited-memory Broyden-Fletcher-Goldfarb-Shanno (BFGS) optimization algorithm to minimize the error of fitting the logistic function to each time series dataset.

$$f(x) = \frac{L}{1 + e^{-k(x-x_0)}} \qquad \text{Equation 13}$$

Wherein:
L is the maximum power generated in the time series data set representing a respective engineering feature;
k is equal to 1;
x is a variable wind speed; and
$x_0$ is a maximum wind speed observed by a respective wind turbine.

By determining the parameters of the logistic function, f(x) power generated as a function of the wind speed, x can be estimated. The logistic function, f(x) and the associated parameters for each wind turbine can be provided to a power curve analyzer 248 of the turbine categorizer 200.

The power curve analyzer 248 can analyze the calculated logistic function (with the associated parameters) for each wind turbine to calculate an area under the curve, auc and a coefficient of determination, $R^2$. The area under the curve, auc can be calculated with Equation 14. The coefficient of determination, $R^2$ can be calculated with Equation 15.

$$auc = \sum_{j=1}^{B} \frac{f(x_{j-1}) + f(x_j)}{2} \Delta x_k \qquad \text{Equation 14}$$

$$R^2 = 1 - \frac{\sum_i (y_i - f_i)^2}{\sum_i (y_i - \bar{y})^2} \qquad \text{Equation 15}$$

Wherein:
f(x) is the logistic function with the associated parameters for a given wind turbine for a selected time series data set representing an engineering function;
B is the number of data samples in the selected time series data set;
x is a windspeed for the given wind turbine;
$y_i$ is the ith value in the selected time series data set; and
$\bar{y}$ is the mean of the selected time series data set.

Thus, for each of the plurality of wind turbines, the mean, the maximum, the minimum or constructed histograms are calculated for each of the K number of time series data sets that each represent an engineering feature. Further, the logistic function, f(x), the area under the curve, auc and the coefficient of determination, $R^2$ can be calculated for each time series data set for each of the plurality of wind turbines. This information provides a sequence of non-overlapping snapshots spanning the chosen span of time (e.g., one year). Moreover, this information can be employed to train a machine learning model (e.g., Random Forest based model) for each wind turbine that characterizes the behavior of the respective wind turbine in the plurality of wind turbines. That is, each model can predict future behavior of a respective wind turbine over time based on the environmental data and the operating data for each of the plurality of wind turbines. The resultant information and the machine learning model for each wind turbine can be provided to a turbine labeler 252 of the turbine categorizer 200.

The turbine labeler 252 can assign a label as potentially damaged or undamaged to each wind turbine based on the information calculated for each wind turbine. More particularly, the turbine labeler 252 can employ Equation 16 to label each wind turbine.

$$\text{label(Turbine, } t) = \begin{cases} \text{potentially damaged,} & \text{if } t_{repair} > t > t_{detected} - p \\ \text{undamaged,} & \text{otherwise} \end{cases} \qquad \text{Equation 16}$$

Wherein:
Turbine is a unique identifier of a given turbine in the plurality of turbines;
t is a point of time in which a snapshot of the behavior the given turbine represents;
$t_{repair}$ is a time (if any) at which the wind turbine was/is repaired;
$t_{detected}$ is a time at which damaged is detected by each model of the given wind turbine; and
p are proximity parameters for the model.

Thus, each wind turbine of the plurality of wind turbines can be labeled as either potentially damaged or undamaged based on the generated model of the behavior of each such wind turbine. Accordingly, the turbine categorizer 200 can employ the Random Forest machine learning algorithm (a classifier) to predict the probability having damage within the next p days. Alternatively, the turbine categorizer 200 can apply a clustering machine learning algorithm to find wind turbines of the plurality of wind turbines with behavior similar to or associated with damaged using Uniform Manifold Approximation and Protection (UMAP) techniques to reduce the dimensionality of the snapshot to a workable level. Accordingly, the turbine categorizer 200 can output a list of wind turbines that are potentially damaged, as indicated by the Equation 16. In some examples, the turbine categorizer 200 can generate and/or augment damage data to include the list of potentially damaged wind turbines.

Figure 5:
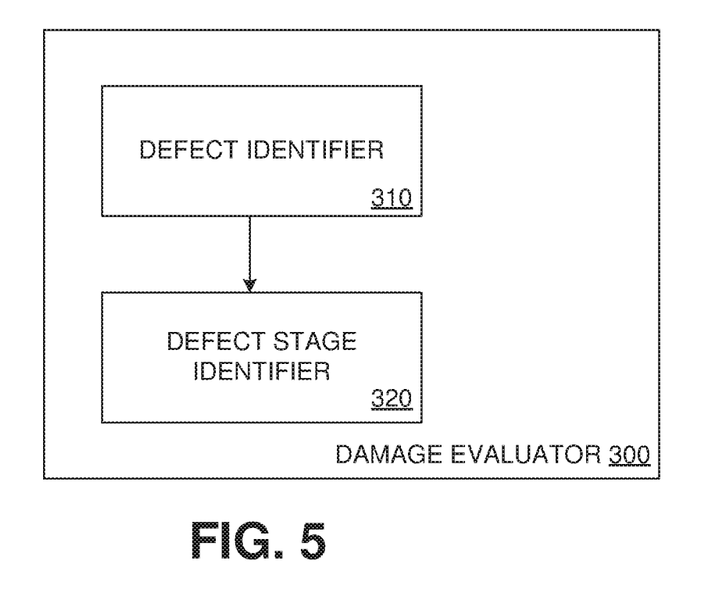
FIG. 5 illustrates a block diagram of a damage evaluator that can predict a damage type and stage for potentially damaged wind turbines.

FIG. 5 illustrates an example of a damage evaluator 300 that could be employed to implement the damage evaluator 70 illustrated in FIG. 1. The damage evaluator 300 can be executed on a computing platform, such as the wind turbine monitoring server 54 of FIG. 1. The damage evaluator 300 can receive damage data that includes a list of potentially damaged wind turbines from a turbine categorizer, such as the turbine categorizer 68 of FIG. 1 and/or the turbine categorizer 200 of FIG. 2. The damage evaluator 300 can also receive environmental data and operating data for a plurality of wind turbines, such as the N number of wind turbines 56 at the M number of wind farms 58 of FIG. 1.

The damage evaluator 300 can execute an LSTM (long short-term memory) machine learning algorithm to predict a damage type and a stage (e.g., a severity) of damage for each potentially damaged wind turbine included in the damage data. More particularly, the damage evaluator 300 can execute a defect identifier 310 that is trained with data to characterize the behavior of wind turbines with specific types of defects. As some examples, Table 2 provides a non-exhaustive list of defects. The LTSM machine learning algorithm employed by the damage evaluator 300 can identify a pattern in the environmental data and/or the operating data for each potentially damaged wind turbine that corresponds to a particular defect, or multiple defects, which can be referred to as a predicted damage type. Thus, the damage evaluator 300 can augment the damage data with data indicated the predicted damage type for each potentially damaged wind turbine.

The damage evaluator 300 also includes a defect stage identifier 320. The defect stage identifier 320 can employ the LSTM machine learning algorithm to identify a stage for the identified damage type of each potentially damaged wind turbine. The stage of the identified damage type can define a severity of the damage type. For instance, a transverse crack (the damage type) may have six (6) engineering defined stages. In such a situation, identifying the particular stage of the transverse crack also provides an indication of a prediction of the stage of the crack. The damage evaluator 300 can augment the damage data with predicted damage type and the stage of the predicted damage type for each potentially damaged wind turbine.

Figure 6:
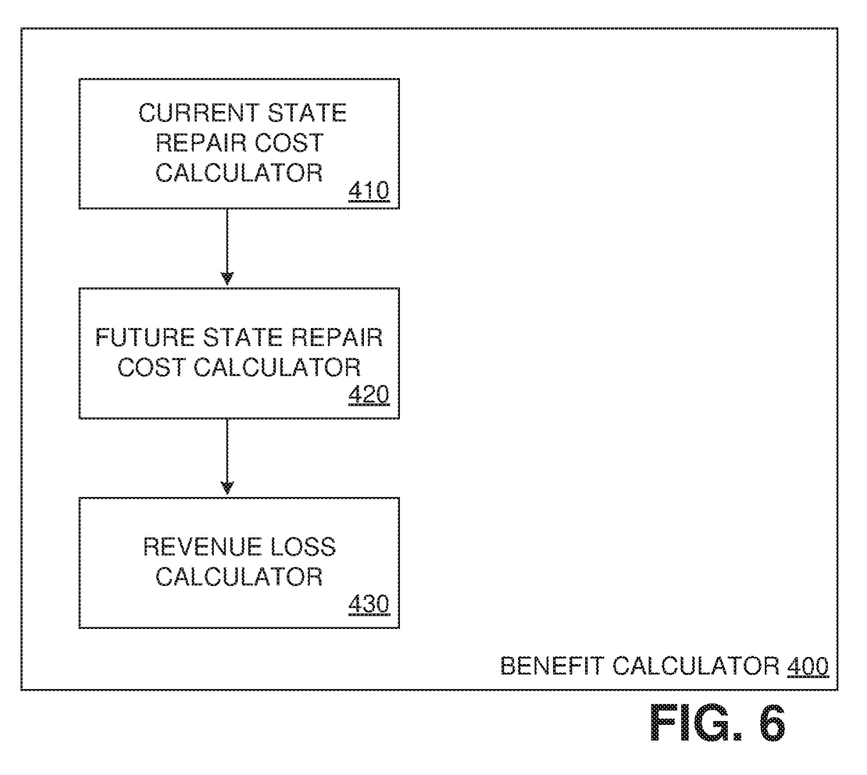
FIG. 6 illustrates a block diagram of a benefit calculator that calculate a net benefit for repairing potentially damaged wind turbines.

FIG. 6 illustrates an example of a benefit calculator 400 that could be employed to implement the benefit calculator 84 illustrated in FIG. 1. The benefit calculator 400 can be executed on a computing platform, such as the wind turbine monitoring server 54 of FIG. 1. The benefit calculator 400 can receive damage data from a damage evaluator, such as the damage evaluator 70 of FIG. 1 and/or the damage evaluator 300 of FIG. 3. Additionally, the benefit calculator 400 can receive environmental data and operating data for each of a plurality of wind turbines, such as the N number of wind turbines 56 at the M number of wind farms 58 of FIG. 1. The damage data can include a list of potentially damaged wind turbines, a predicted damage type and a predicted stage of each predicted damage type.

The benefit calculator 400 can employ a cluster based unsupervised machine learning algorithm to calculate a net benefit for repairing each of the potentially damaged wind turbines. The benefit calculator 400 can include a current state repair cost calculator 410 that can calculate a repair cost of each potentially damaged wind turbine based on the predicted damage type and the predicted current (present) stage of the damage type. To determine the repair cost for the predicted damage type and stage for each potentially damaged wind turbine, the current state repair cost calculator 410 can evaluate costs of repairs for the same or similar repair from a previous time (e.g., a previous year).

Additionally, the benefit calculator 400 can include a future state repair cost calculator 420 that can calculate a next consequential damage cost for each potentially damaged wind turbine. The next consequential damage cost can correspond to a predicted repair cost for a next stage of the damage type. Stated differently, for a given wind turbine predicted to have a particular damage type with at a first stage of damage, the next consequential damage cost can be the repair cost for the same damage type at a second stage of the damage type.

The benefit calculator 400 can include a revenue loss calculator 430 that calculates a predicted availability loss revenue (ALR) for each potentially damaged wind turbine going out of service. The predicted ALR can be based on predicted power generation, a production tax credits (PTC) (if available), a power purchase agreement (PAA) and a predicted failure date for each potentially damaged wind turbine over a selected amount of time. For example, if a given wind turbine has a predicted failure date thirty (30) days in the future, and a selected time of six (6) months, the revenue loss calculator 430 can calculate an ALR for four (4) months. The ALR can be the difference between an expected power generation and actual power generation multiplied by the PPA (and/or other agreement/laws) for a given wind turbine. As an example, the ALR can be inclusive of the predicted amount of power generated in the four (4) months, as well as any available PCT credits and/or revenue specified in the PPA for the given wind turbine. The predicted amount of power generated could be based, for example, on weather patterns predicted for the location of the given wind turbine and/or previous amounts of power generated over the same or similar time period in a previous year. In summary, the revenue loss calculator 430 can calculate the predicted amount of revenue that would be lost over the selected amount of time until a repair is made for an associated potentially damaged wind turbine. As an example, the benefit calculator 400 can employ Equation 17 to calculate a net benefit, NB for repairing a given wind turbine.

$$NB = (Cost_{RepairNext} - Cost_{RepairCurrent}) + (ALR_{Next} - ALR_{Current})$$  Equation 17

Wherein:
$Cost_{RepairNext}$ is the average historical repair cost for a next consequential damage stage of the given wind turbine;
$Cost_{RepairCurrent}$ is the actual (predicted) repair cost of the given wind turbine at the current damage stage;
$ALR_{NEXT}$ is the average ALR for the next consequential damage stage; and
$ALR_{Current}$ is the actual ALR for of the given wind turbine for the current damage stage.

As noted with respect to FIG. 1, the net benefit, NB can be employed to assign a priority of repair to each wind turbine. Moreover, as also noted with respect to FIG. 1, such priority of repair is employable to dispatch a service crew (e.g., the service crew 92 of FIG. 1) to schedule repairs of wind turbines to curtail downtime of the wind turbines.

Figure 7:
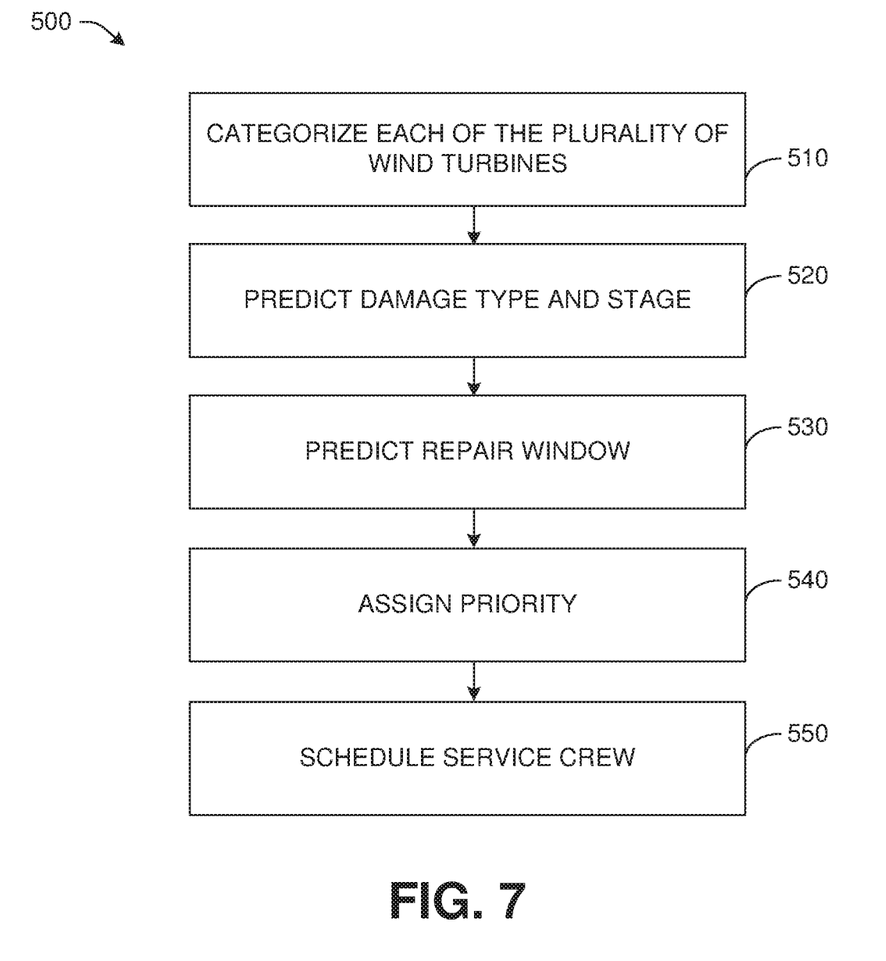
FIG. 7 illustrates a flowchart of an example method for predicting damage of wind turbines.

In view of the foregoing structural and functional features described above, an example method will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flow diagram of an example method 500 for predicting damage for a plurality of wind turbines, such as the N number of wind turbines 56 on the M number of wind farms 58 of FIG. 1. At 510, a turbine categorizer (e.g., the turbine categorizer 62 of FIG. 1 and/or the turbine categorizer 200 of FIG. 2) executing on one or more computing platforms can categorize each of a plurality of wind turbines as being damaged or undamaged to form a list of potentially damaged wind turbines. At 520, a damage evaluator (e.g., the damage evaluator 70 of FIG. 1 and/or the damage evaluator 300 of FIG. 5) executing on the one or more computing platforms can predict a damage type and a stage of the damage type for each wind turbine in the list of potentially damaged wind turbines. At 530 an impact engine (e.g., the impact engine 80 of FIG. 1) executing on the one or more computing platforms can predict a repair window. Moreover, at 540, the impact engine can assign a priority of repair for each wind turbine in the list of potentially damaged wind turbines based on a respective predicted damage type and stage and on the repair window. At 550, a maintenance scheduler (e.g., the maintenance scheduler 90 of FIG. 1) operating on the one or more computing platforms can schedule deployment of a service crew to repair a subset of the plurality wind turbines in the list of potentially damaged wind turbines service. The deployment can be based on data associated with each wind turbine in the list of potentially damaged wind turbines, which data can include the priority of repair of each wind turbines in the list of potentially damaged wind turbines.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for monitoring a plurality of wind turbines comprising:
    a turbine categorizer, executing on one or more computing platforms that categorizes each of a plurality of wind turbines as being damaged or undamaged to form a list of potentially damaged wind turbines;
    a damage evaluator executing on the one or more computing platforms that predicts a damage type and a stage for each wind turbine in the list of potentially damaged wind turbines; and
    an impact engine executing on the one or more computing platforms that assigns a repair window and a priority for each wind turbine in the list of potentially damaged wind turbines based on a respective predicted damage type and stage.

2. The system of claim 1, the system further comprises a scheduling service that analyzes data associated with each wind turbine in the list of potentially damaged wind turbines to schedule deployment of service crews to repair a subset of the plurality wind turbines in the list of potentially damaged wind turbines.

3. The system of claim 1, wherein the turbine categorizer comprises an unsupervised machine learning algorithm.

4. The system of claim 1, wherein the turbine categorizer calculates a rotor blade dynamic gravity impact and a rotor imbalance for each wind turbine in the plurality of wind turbines to categorize each respective wind turbine.

5. The system of claim 1, wherein the turbine categorizer calculates turbulence intensity impact and an aerodynamic performance for each wind turbine in the plurality of wind turbines to categorize each respective wind turbine.

6. The system of claim 1, wherein the turbine categorizer calculates a temperature and humidity impact for each wind turbine in the plurality of wind turbines to categorize each respective wind turbine.

7. The system of claim 1, wherein the turbine categorizer calculates an accumulative impact of outliers of a nacelle position, an axial load impact and a shutdown impact for each wind turbine of the plurality of wind turbines to categorize each respective wind turbine.

8. The system of claim 1, wherein the turbine categorizer calculates a pitch anomaly and a weak effect impact for each wind turbine of the plurality of wind turbines to categorize each respective wind turbine.

9. The system of claim 1, wherein the turbine categorizer fits a logistic function to a power curve over a time interval to categorize each respective wind turbine.

10. The system of claim 1, wherein the damage type predicted by the damage evaluator for a given wind turbine in the list of potentially damaged wind turbines characterizes a crack or a chip.

11. The system of claim 1, wherein the damage type predicted by the damage evaluator for a given wind turbine in the list of potentially damaged wind turbines characterizes erosion.

12. The system of claim 1, wherein the damage type predicted by the damage evaluator for at least one wind turbine in the list of potentially damaged wind turbines characterizes a location in a blade of the damage in the given wind turbine.

13. The system of claim 1, wherein the impact engine comprises a benefit calculator that calculates a predicted availability loss revenue (ALR) for each of the potentially damaged wind turbines base on an associated predicted repair window.

14. The system of claim 13, wherein the priority of repair for each of the potentially damaged wind turbines is based on the predicted ALR.

15. A system for generating electric power comprising:
    a supervisory control and data acquisition system operating on one or more computing platforms that communicates with a plurality of wind turbines and receives environmental data and operating data for each of the plurality of wind turbines;
    a wind turbine monitoring server operating on the one or more computing platforms that:
        categorizes each of the plurality of wind turbines as being damaged or undamaged to form a list of potentially damaged wind turbines based on the environmental data and the operating data;
        predicts a damage type and a stage for each wind turbine in the list of potentially damaged wind turbines;
        assigns a repair window and a priority for each wind turbine in the list of potentially damaged wind turbines based on a respective predicted damage type and stage; and
        stores damage data comprising:
            the list of potentially damaged wind turbines;
            the predicted damage type and stage for each of the potentially damage wind turbines; and
            the repair window and the priority for each of the plurality of potentially damaged wind turbines.

16. The system of claim 15, wherein the damage data is provided to a maintenance scheduler that schedules deployment of a service crew based on the repair window and the priority of each of the plurality of potentially damaged wind turbines.

17. The system of claim 15, wherein the categorizing of each of the plurality of wind turbines is based on a calculated model for each of the plurality of wind turbines that characterizes a behavior of each of the plurality of wind turbines over time.

18. The system of claim 17, wherein the model associated with each wind turbine is based on data characterizing a plurality of engineering features that are calculated for each of the plurality of wind turbines.

19. A method for monitoring operation of a plurality of wind turbines, the method comprising:
- categorizing, by a turbine categorizer executing on one or more computing platforms, each of a plurality of wind turbines as being potentially damaged or undamaged to form a list of potentially damaged wind turbines;
- predicting, by a damage evaluator executing on the one or more computing platforms, a damage type and a stage for each wind turbine in the list of potentially damaged wind turbines; and
- assigning, by an impact engine executing on the one or more computing platforms, a repair window and a priority of repair for each wind turbine in the list of potentially damaged wind turbines based on a respective predicted damage type and stage.

20. The method of claim 19, further comprising:
- scheduling, by a maintenance scheduler, deployment of a service crew to repair a subset of the plurality wind turbines in the list of potentially damaged wind turbines service based on the assigned priority of repair for each wind turbine in the list of potentially damaged wind turbines.

* * * * *